United States Patent [19]

Matsuda

[11] Patent Number: 4,490,590
[45] Date of Patent: Dec. 25, 1984

[54] SWITCHING SYSTEM WITH GROUNDING DEVICE

[75] Inventor: Setsuyuki Matsuda, Kobe, Japan

[73] Assignee: Mitsubishi Denki Kabushiki Kaisha, Tokyo, Japan

[21] Appl. No.: 461,979

[22] Filed: Jan. 26, 1983

[30] Foreign Application Priority Data

Feb. 3, 1982 [JP] Japan ................ 57-16719
Feb. 3, 1982 [JP] Japan ................ 57-16720

[51] Int. Cl.³ .............................. H01H 9/20
[52] U.S. Cl. ................ 200/50 C; 200/82 R; 361/42
[58] Field of Search ........... 200/50 C, 82 R, 82 B, 200/144 R, 34, 83 T; 361/42, 43, 44, 45, 46, 47, 48, 49, 50

[56] References Cited

U.S. PATENT DOCUMENTS 2,084,877  6/1937  Uhde ................ 200/50 C
2,389,856 11/1945  Jones ................ 200/34
2,750,464  6/1956  Viboud ............... 200/82 B
2,824,978  2/1958  Knudsen ............. 361/47 X

FOREIGN PATENT DOCUMENTS

55-26650  7/1980  Japan .
57-42509  3/1982  Japan .

Primary Examiner—A. D. Pellinen
Assistant Examiner—Morris Ginsburg
Attorney, Agent, or Firm—Wenderoth, Lind & Ponack

[57] ABSTRACT

The disclosed switching system comprises a circuit breaker, a grounding device, a locking device for the grounding device, and a fluid filled axially movable cylinder connected at one end to the circuit breaker and including at the other end a spring loaded piston connected to the locking device. When the circuit breaker is opened upon the occurrence of a fault on a mating electric path, the cylinder and then an internal piston is moved to release the locking device to ground the electric path through the closure of the grounding device which is then opened. After about one second determined by a first flow passageway for throttling a flow of fluid between two compartments of the cylinder disposed on both sides of the piston and a second flow passageway with a check valve extending between those compartments, the piston and the cylinder are returned back to their original positions to lock the grounding device in its open position by the locking device. The abovementioned cylinder may be replaced by a stationary cylinder including a first piston connected to the circuit breaker and a second piston loaded with a spring and connected to the locking device. The cylinder includes the two outermost compartments interconnected through a communicating tube and two compartments on both sides on the first piston bridged by a throttle device and a check valve.

7 Claims, 10 Drawing Figures

SWITCHING SYSTEM WITH GROUNDING DEVICE

BACKGROUND OF THE INVENTION

1. Field of the Invention;

This invention relates to a switching system comprising a circuit breaker for performing a reclosing operation at a high speed, a grounding device, and an interlocking device for mechanically interlocking the grounding device with the circuit breaker.

2. Description of the Prior Art;

Upon the occurrence of a ground fault in one wire of two wire power transmission lines suspended together from a tower and; operative with high voltage, for example, 1,000 kilovolts, a short circuit current on the order of thousands of amperes may result. At such an occurrence,; even the opening of associated circuit breakers at both ends of the one short-circuited wire of; the two power transmission lines does not readily result in the extinction of an electric arc of a small current on the order of tens of amperes caused by; an induced voltage from the other wire of the power transmission lines. Thus, if the circuit breakers perform the high speed reclosure operation then the high voltage is applied to the one wire before the extinction of the electric arc at the fault point. This results in the fault again occurring. To avoid this objection, it has been a conventional practice to disconnect a failed transmission line from a mating electric source by associated circuit breakers after which an associated high speed operating grounding device is immediately closed to reduce the particular induced voltage to extinguish an electric arc at a fault point and then the circuit breaker is reclosed at a high speed. For example, the grounding device has been able to be closed at a high speed corresponding to about five cycles of the system current after the interruption by the circuit breakers and to be put in its closed position for a time interval corresponding to about fifteen cycles of the system current after which the grounding device is opened at a high speed corresponding to about five cycles of the system current. Thereafter the occurrence of a malfunction might result in a ground fault. Thus it is desirable to provide an interlocking device for enabling the operation of an operating mechanism for the grounding device for a time interval of from 0.5 to 1 second immediately after the opening of the circuit breakers but disabling the operation thereof for the remaining time interval.

This measure can be electrically accomplished by applying electrical signals to the operating mechanisms for the circuit breakers and grounding device through delayed relays to initiate the operations thereof respectively. Alternatively a mechanical interlocking device may be used for the same purpose in order to provide for the safety thereof. In the latter case it is desirable to provide a mechanical interlocking device prevented from adversely affecting the operation of the circuit breakers due to its being out of order.

Accordingly it is an object of the present invention to provide a new and improved switching system prevented from malfunctioning by the provision of a mechanical locking device for enabling the operation of a grounding device involved only for a predetermined short time interval immediately after the opening of an associated circuit breaker which is reclosable at a high speed.

SUMMARY OF THE INVENTION

The present invention provides a switching system comprising an electric path, a circuit breaker connected to the electric path, a first operating mechanism for opening and closing the circuit breakers, a grounding device for grounding the electric path, a second operating mechanism for closing and opening the grounding device, a locking device for locking the grounding device in an ungrounded state, and a locking control mechanism interlocking with the first operating mechanism and responsive to an interruption by the circuit breaker to be driven to release the locking device from its locking state after which the locking control mechanism causes the locking device to be returned back to its locking state at the end of a predetermined time interval.

In a preferred embodiment of the present invention the locking control mechanism may comprise an axially movable cylinder filled with a fluid and connected at one end to the circuit breakers, a piston slidably movable within the cylinder to divide the cylinder into a first and a second compartment located at the one and other ends of the cylinder respectively the piston being connected to the locking device through the side of the other end of the cylinder, a first fluid flow passage way for connecting the first compartment to the second compartment to permit the fluid to flow in a predetermined amount from one to the other of the first and second compartments, a second fluid flow passage way including a check valve to permit the fluid to only flow from the first to the second compartment, and a helical spring disposed in the first compartment to tend to force the piston toward the other end of the cylinder, the arrangement being constructed so that the cylinder is responsive to the opening of the circuit breaker to be moved from the other to the one end thereof.

In another preferred embodiment of the present invention, the locking control mechanism may comprise a stationary cylinder filled with a fluid, a pair of first and second movable discs slidably movable in the cylinder to divide the cylinder into a first and a second compartment located on the sides of one and the other end of the cylinder and a third compartment disposed between the first and second movable discs, the first movable disc being connected to the circuit breakers, the second movable disc being connected to the locking device, a communicating tube disposed outside of the cylinder to permit the fluid to flow from one to the other of the first and second compartment, a throttle device and a check valve for bridging in parallel relationship the first and third compartments, the throttle device permitting the fluid to flow in a predetermined amount from one to the other of the first and third compartments, the check valve permitting the fluid to only flow from the first to the third compartment, and a helical spring disposed in the second compartment to tend to force the second movable disc toward the first movable disc, the arrangement being constructed so that the first movable disc is responsive to the opening of the circuit breakers to be forced toward the second movable disc to pressurize the fluid within the third compartment to move the second movable disc against the action of the helical spring thereby to release the locking device.

BRIEF DESCRIPTION OF THE DRAWINGS

The present invention will become more readily apparent from the following detailed description taken in conjunction with the accompanying drawings in which.

Throughout the Figures like reference numerals designate the identical or corresponding components.

DESCRIPTION OF THE PREFERRED EMBODIMENTS

Figure 1:
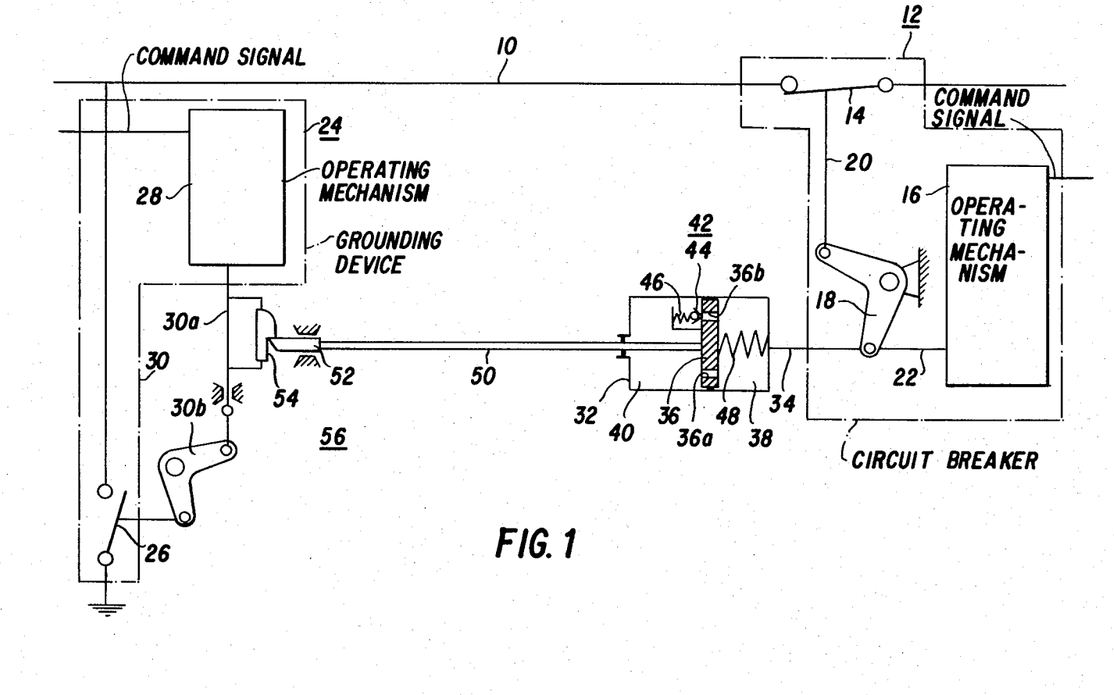
FIG. 1 is a combined block and connection diagram of one embodiment according to the switching system of the present invention.

Referring now to FIG. 1 of the drawings there is illustrated one embodiment according to the switching system of the present invention. The arrangement illustrated comprises an electric path 10 connected to a high voltage power transmission line (not shown), and a circuit breaker 12 to interrupt the electric path 10. The circuit breaker 12 includes a first pair of normally closed contacts 14, an operating mechanism 16 for opening and closing the first pair of contacts 14, and a connecting mechanism 18 in the form of an L-shaped lever connected on one leg to a movable arm of the first pair of contacts 14 through a driving rod 20 and on the other leg to the operating mechanism 16 through another driving rod 22 with the L-shaped lever 18 connected to ground.

Then a grounding device 24 is connected to the electric path 10 at the left hand side of FIG. 1; More specifically the grounding device 24 includes a second pair of normally open contacts 26 connected across the electric path 10 and ground, and an operating mechanism 28 connected via a connecting mechanism 30 to a movable arm mechanically connected to the grounded one of the two normally open contacts 26. The operating mechanism 28 is operative to close and open the second pair of contacts 26, and the connecting mechanism 30 includes a driving rod 30a and an L-shaped lever 30b having one leg connected to the driving rod 30a and the other leg connected to the movable arm of the second pair of normally open contacts 26.

The arrangement comprises further an axially movable cylinder 32 connected at one end to a driving rod 34 connected to the other leg of the connecting mechanism 18 and therefore to the driving rod 22. The cylinder 32 is filled with a fluid such as an oil and has a piston 36 slidably disposed therein. The piston 36 includes first and second flow passageways 36a and 36b respectively extending therethrough and cooperates with the cylinder 32 to form a first compartment 38 located on the side of the one end of the cylinder 32 and also a second compartment 40 located on the side of the other end thereof. The first flow passageway 36a is operative to throttle the fluid flowing from one to the other of the compartments 38 and 40. The second flow passageway 36b is operatively coupled to a check valve 42 and including a plug 44 disposed in the second compartment 40 to be capable of closing the second passageway 36b and a helical spring 46 also disposed in the second compartment 40 to normally push the plug 44 in a direction directed from the other to the one end of the cylinder 32. Thus the check valve 42 serves to permit the fluid within the cylinder 32 to only flow from the first compartment 38 to the second compartment 40. Further a helical spring 48 is disposed within the first compartment 38 to tend to force the piston 36 toward the other end of the cylinder 32.

Also a driving rod 50 is centrally extended from that surface of the piston 36 facing the second compartment 40 and connected to a hooked member 54 after it has been extended movably in fluid tight relationship through the other end of the cylinder 32. A latch 52 is shown in FIG. 1 as engaging the hooked member 54 interlocking with the driving rod 30a. The latch 52 and the hooked member 54 form a locking device 56 to lock the connecting mechanism 30 for the second pair of contacts 26 to the driving rod 50;

The operation of the arrangement shown in FIG. 1 will now be described. Upon applying a command interrupting signal to the operating mechanism 16 for the circuit breaker 12, the driving rod 22 is moved in the righthand direction as viewed in FIG. 1 to open the first pair of normally closed contacts 14 through the connecting mechanism 18 resulting in the interruption of a fault current through the electric path 10.

On the other hand, the righthand movement of the driving rod 22 causes the cylinder 32 to be also moved in the righthand direction as viewed in FIG. 1 through the driving rod 34. At that time the piston 36 is similarly moved in the righthand direction within the cylinder 32 filled with the fluid. This movement results in the driving rod 50 disengaging the latch 52 from the hooked member 54. Thus the grounding device 24 is put in its free movable state. Until that time, a command closure signal has been applied to the operating mechanism 28 for the grounding device 24 to move the driving rod 30a in a downward direction as viewed in FIG. 1. Thus movement to close the second pair of normally open contacts 26 is initiated. When five cycles of the system current elapses after the circuit breaker 12 has completed the interruption of the fault current through the opening of the first pair of normally closed contacts 14, the grounding device 24 connects the electric path 10 and therefore the mating transmission line (not shown) to ground through the closure of the second pair of normally open contacts 26 and is maintained in its closed position for a time interval corresponding to from 15 to 20 cycles of the system current. After the extinction of an electric arc struck at a fault point on the transmission line, the grounding device 24 performs the interrupting operation at a high speed corresponding to about five cycles of the system current to open the second pair of contacts 26. Thus the grounding device 24 is in readiness for the succeeding reclosure of the circuit breaker 12.

The grounding device 24 can be normally brought into its open position at the end of a time interval of from 0.5 to 0.6 second starting with the application of the command interruption signal to the operating mechanism 16 for the circuit breaker 12 but after the lapse of one second following the interruption of the fault current by considering some margin. The operating mechanism 28 for the grounding device 24 is locked by the latch 52 for the purposes of preventing the grounding device 24 from malfunctioning. Those purposes can be attained by utilizing the throttling by the first flow passageway 36a extending through the piston 36.

More specifically, the piston 36 is forced in a lefthand direction as viewed in FIG. 1 within the cylinder 32 by the action of the helical spring 48 but it does so slowly because the fluid flows through the first flow passageway 36a. Thus the driving rod 50 connected to the piston 36 moves the latch 52 in a direction to engage the latter with the hooked member 54 until the two are put in engagement with each other. A time interval required for the latch 52 to engage the hooked member 54 can be determined by adjusting the size of the first passageway 36a.

From the foregoing it is seen that, when the second compartment 40 becomes higher in fluid pressure than the first compartment 38 due to the interrupting operation of the circuit breaker 12, the check valve 42 is operative to stop the fluid from flowing into the second compartment 40 through the second flow passageway 36b but, when the circuit breaker 12 performs the reclosure operation to cause the first compartment 38 to be higher in fluid pressure than the second compartment 40, such operation permits immediately the fluid to flow through the second flow passageway 36b toward the second compartment 40 resulting in readiness for the operation upon the next succeeding interruption.

Thus the axially movable cylinder 32 with the piston 36 is connected to the circuit breaker 12 and latch 52 through the driving rods 34 and 50 forming linkages respectively and serves as a locking control mechanism, which is operative to engage the latch 52 with the hooked member 54 after the lapse of about one second reckoned from each interruption effected by the circuit breaker 12, whereby the grounding device 24 is prevented from being erroneously closed until the next succeeding interruption will be effected by the circuit breaker 12. This interaction results in the highly reliable operation of the invention.

Also the fluid pressure within the cylinder 32 is only instantaneously high and normally approximates the atmospheric pressure. Therefore there is scarcely a fear that the fluid may leak from the cylinder 32. This fact results in a highly reliable structure.

Figure 2:
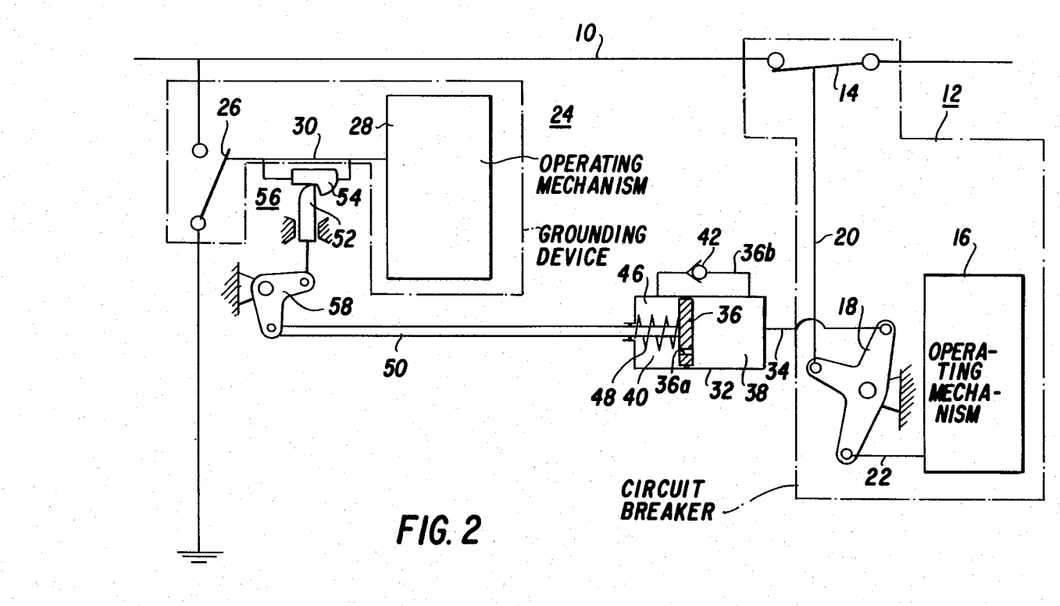
FIG. 2 is a diagram similar to FIG. 1 but illustrating a modification of the arrangement shown in FIG. 1.

FIG. 2 shows a modification of the arrangement shown in FIG. 1. The arrangement illustrated comprises the axially movable cylinder 32 different from that shown in FIG. 1 only in that, in FIG. 2, the piston 36 includes only the first flow passageway 36a and a communicating tube 36b is disposed outside of the cylinder 32 to open at both ends in the first and second compartments 38 and 40 respectively of the cylinder 32 and includes a check valve 42. Also the helical spring 48 is disposed in the second compartment 40 to tend to force the piston 36 toward the one end of the cylinder 32.

Further the connecting mechanism 18 for the circuit breaker 12 is in the form of a T-shaped lever including three ends connected to the movable arm for the first pair of normally closed contacts 14, the operating mechanism 16 and the axially movable cylinder 32 through the driving rods 20, 22 and 34 respectively.

In the grounding device 24 the operating mechanism 28 is connected to the movable arm for the second pair of normally open contacts 26 through the connecting mechanism 30 in the form of a single driving rod also designated by the same reference numeral 30.

Further the driving rod 50 extending from the piston 36 is connected to the latch 52 through an L-shaped lever 58 connected to ground and the hooked member 54 interlocks the driving rod 30 with the rod 50 through the lever 58 forming a linkage disposed between the cylinder 32 and the latch 52.

In other respects the arrangement of FIG. 2 is identical to that shown in FIG. 1.

Figure 3:
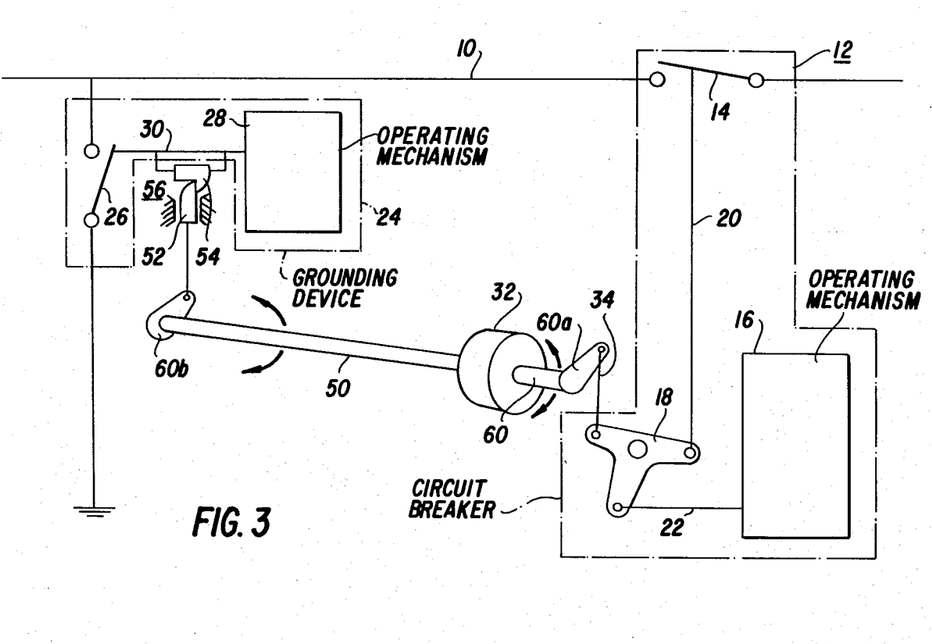
FIG. 3 is a diagram similar to FIG. 1 but illustrating another modification of the arrangement shown in FIG. 1 with parts illustrated in perspective.

The arrangement illustrated in FIG. 3 is different from that shown in FIG. 2 principally in that in FIG. 3 a cylinder rotatable about the longitudinal axis thereof is substituted for the axially movable cylinder 32. The rotatable cylinder is also designated by the same reference numeral 32 and is connected at one end to the driving rod 34 through a driving rod 60 and an arm 60a forming a linkage with the driving rod 34. The driving rod 34 is articulated to both the arm 60a and one of the opposite ends of the T-shaped lever 18 including the other opposite end coupled to the movable arm 20 for the first pair of normally closed contacts 14 and the remaining end to the operating mechanism 16.

Figure 4:
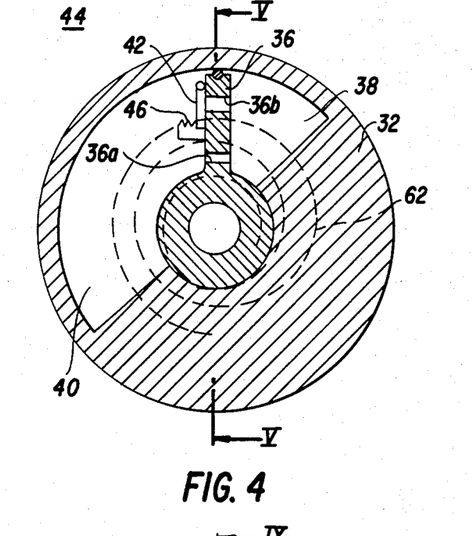
FIG. 4 is a cross sectional view of the rotatable cylinder shown in FIG. 3.
Figure 5:
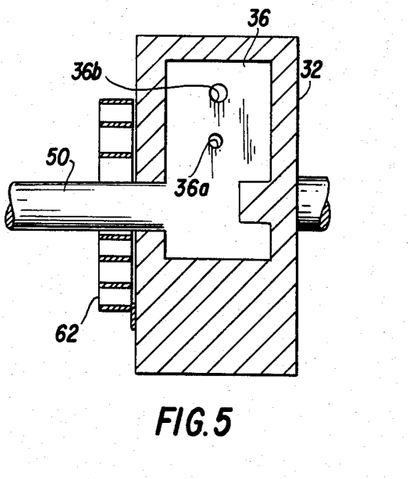
FIG. 5 is an axial sectional view as viewed on the line V-V of FIG. 4.

As best shown in FIG. 4, the rotatable cylinder 32 includes a space in the form of a circular segment subtended by an angle of substantially 180 degrees, and a vane-shaped piston 36 radially outward extended from the central portion of the cylinder 32 to divide the space into the first and second compartments 38 and 40 respectively as in the arrangement shown in FIG. 1. As shown in FIG. 5, the piston 36 is integrally connected to the driving rod 50 rotatably journalled by the cylinder 32 and operatively coupled to a spiral spring 48 disposed outside of the cylinder 32 to be fixed at one end to the other end surface thereof and at the other end to the driving rod 50. The spiral spring 48 is operative to impart to the driving rod 50 a driving force in a counterclockwise direction as viewed in FIG. 4.

Referring back to FIG. 3, the driving rod 50 is connected to the arm 60b similar to the arm 60a and operatively coupled to the latch 52. Thus the driving rod 50, and arm 60b form a linkage for the rotatable cylinder 32.

In other respects, the arrangement is identical to that shown in FIG. 2 and the piston 36 is also identical to that illustrated in FIG. 1.

As in the arrangement of FIG. 1, the circuit breaker 12 performs the interrupting operation to rotate the cylinder 32 through a predetermined angle in a clockwise direction as viewed in FIG. 3 or 4 through the arm 60a. This action results in a rotation of the piston 36 in a clockwise direction as viewed in FIG. 4 through a predetermined angle because of the presence of a fluid pressure in the space of the cylinder 32. Thus, as shown in FIG. 3, the driving rod 50 is similarly rotated to disengage the latch 52 from the hooked member 54 through the arm 60b.

Thereafter the process as described above in conjunction with FIG. 1 is repeated to again engage the latch 52 with the hooked member 54. In this case as viewed in FIGS. 3 and 4, the spiral spring 62 is operated to rotate the driving rod 50, the piston 36, the cylinder 32, and the associated compartments in the counterclockwise direction.

In the arrangement shown in FIGS. 3, 4 and 5, the driving rod 50 is of the rotatable type and has less inertia force as compared with the arrangement shown in FIG. 1 or 2 in which the driving rod 50 effects the reciprocating movement. Thus the arrangement is advantageous in that a small force can drive each of the connecting devices or linkages operative at a high speed.

While the present invention has been illustrated and described in conjunction with the embodiments thereof including the cylinder 32 connected to the circuit breaker 12 and the piston 36 connected to the locking device 56, it is to be understood that the invention is not restricted thereto or thereby and that it is equally applicable to what includes the cylinder 32 connected to the locking device 56 and the piston 36 connected to the circuit breaker 12.

Figure 6:
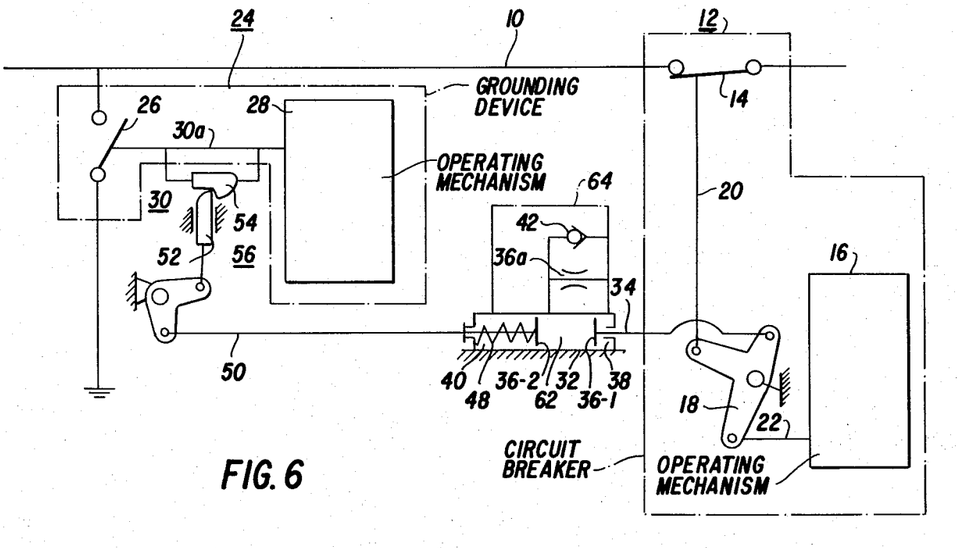
FIG. 6 is a combined block and connection diagram of a modification of the present invention.

Referring now to FIG. 6, there is illustrated a modification of the present invention. The arrangement illustrated is different from that shown in FIG. 2 only in that in FIG. 6 the lock control mechanism in the form of a stationary cylinder filled with a fluid, for example, an oil and including a pair of movable discs resembling pistons. More specifically, the stationary cylinder 32 includes a pair of movable discs 36-1 and 36-2 slidably movable therein to maintain a predetermined spacing therebetween and to divide the interior of the cylinder 32 into a first and a second compartment 38 and 40 disposed on one and the other end of the cylinder 32 respectively and an intermediate or a third compartment 62 sandwiched between the first and second compartments 38 and 40. Those three compartments 38, 40 and 62 are physically isolated from one another by the pair of movable discs 36-1 and 36-2. The movable disc 36-1 is connected to the driving rod 34 movably extending in fluid tight relationship through the one end of the cylinder 32 and the movable disc 36-2 is connected to the driving rod 50 movably extending in fluid tight relationship through the other end of the cylinder 32. Also the helical spring 48 is disposed within the second compartment 40 to surround the adjacent portion of the driving rod 50 and tends to force the movable disc 36-2 toward the movable disc 36-1.

Furthermore a communicating tube 64 is disposed outside of the cylinder 32 to connect the first compartment 38 in fluid communication to the second compartment 40 while a throttle device 36a and a check valve 42 respectively are connected in a pair of parallel tubes disposed outside of the cylinder 32 to bridge the first and third compartments 38 and 62 respectively. The throttle device 36a permits the fluid to flow in a controlled amount from one to the other of the first and second compartments 38 and 40 therethrough and the check valve 42 permits the fluid to pass through the mating tube in only a direction extending from the first compartment 38 to the third compartment 62.

Upon applying a command interrupting signal to the operating mechanism 16 for the circuit breaker 12 the process as described above is repeated. In that process, the driving rod 34 is moved in a lefthand direction as viewed in FIG. 6 to move the movable disc 36-1 in the same direction within the cylinder 32 resulting in an increase in fluid pressure in the third compartment 62. The fluid thus increased in pressure forces the movable disc 36-2 in the lefthand direction as viewed in FIG. 6 against the action of the helical spring 48. This action results in the release of the latch 52 from the hooked member 54 through the driving rod 50 and associated linkage as described above.

Thereafter the grounding device 24 is operated as described above in conjunction with FIG. 1. After the lapse of about one second determined from the interruption by the circuit breaker 12 as described above, the throttle device 36a is operated to prevent malfunction due to the re-locking of the latch 52. More specifically, the fluid in the third compartment 62 has become high in pressure due to both the movement of the movable disc 36-1 and the force of the helical spring 48 applied to the movable disc 36-2 but the fluid from the first compartment 38 flows into the second compartment 40 through the throttle device 36a to permit the movable disc 36-2 to be moved in a righthand direction as viewed in FIG. 6 until the latch 52 is put in engagement with the hooked member 54 after the lapse of the required time interval determined by adjusting the size of the throttle device 36a in this case, about one second as in the arrangement such as shown in FIG. 1.

Also the check valve 42 is responsive to an increase in fluid pressure within the third compartment 62 due to the interrupting operation performed by the circuit breaker 12 to suspend the flow of fluid from the first compartment 38 to the third compartment 40 therethrough and responsive to an increase in fluid pressure within the first compartment 38 due to the closing operation of the circuit breaker 12 to immediately permit the flow of fluid into the third compartment 62 to return the fluid back thereto resulting in readiness for the next succeeding interruption. Accordingly, upon the closure of the circuit breaker 12, the movable disc 36-2 may only remain immobile or be reset to its original position.

The arrangement of FIG. 6 has, in addition to the advantages described above, the following advantages: There is scarcely a fear that the fluid such as the oil will leak from the associated compartments 38, 40, and 62. This advantage occurs because the fluid portions within the communicating bypass tube 64, the throttle device 36a, and the check valve 42, in addition to the cylinder 32, only instantaneously increases in pressure and can be normally put under pressures approximating the atmospheric pressure and the circuit breaker 12 is connected to the grounding device 24 through a mechanically connecting mechanism.

Figure 7:
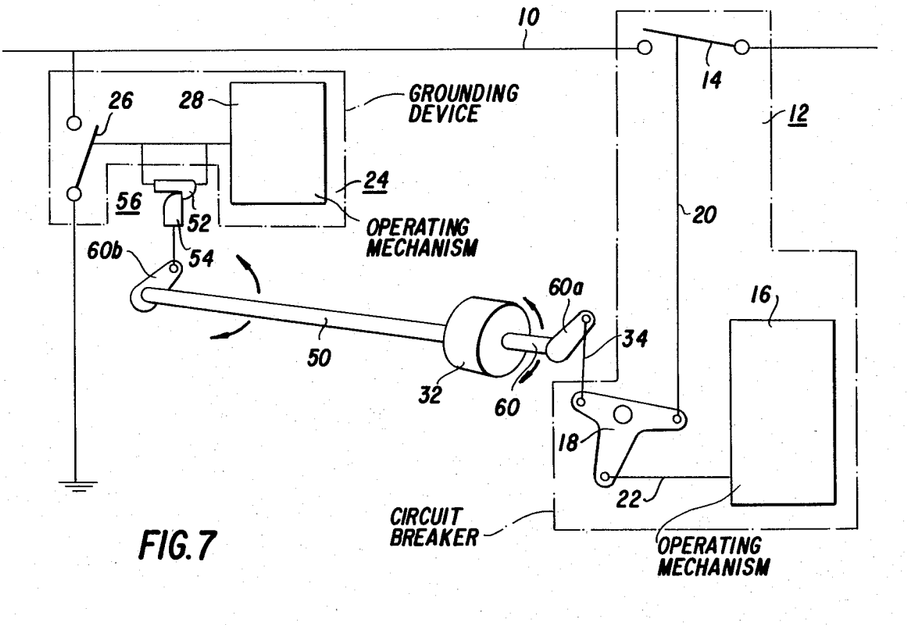
FIG. 7 is a diagram similar to FIG. 3 but illustrating a modification of the arrangement shown in FIG. 6 with parts illustrated in perspective.
Figure 8:
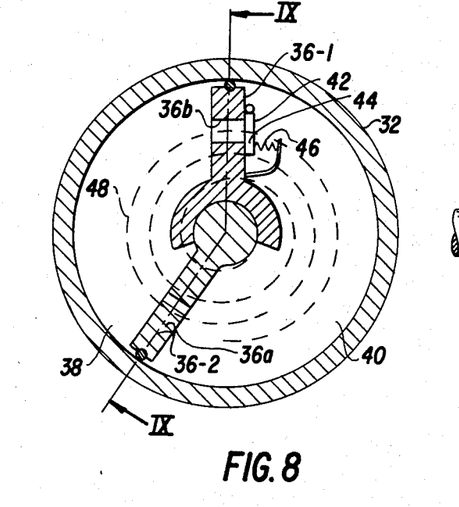
FIG. 8 is a cross sectional view of the cylinder shown in FIG. 7.

In the arrangement illustrated in FIGS. 7 and 8 a rotatable cylinder 32 includes a pair of movable radial members 36-1 and 36-2 in the form of vane-shaped pistons rotatably connected to each other by having the radially inner end of the movable radial member 36-2 in the form of a cylindrical portion coaxial with the rotatable cylinder 32 and rotatably engaging a socket complementary in cross section to the cylindrical portion and forming the radially inner end of the movable radial member 36-1. Thus the movable radial members 36-1 and 36-2 can be slidably rotated within the cylinder 32 and divide the interior of the cylinder 32 into first and second compartments 38 and 40 respectively. Furthermore the movable radial member 36-1 has extending therethrough the second flow passageway 36b with the check valve 42 and the movable radial member 36-2 has the first flow passageway 36a as described above in conjunction with FIG. 1.

Figure 9:
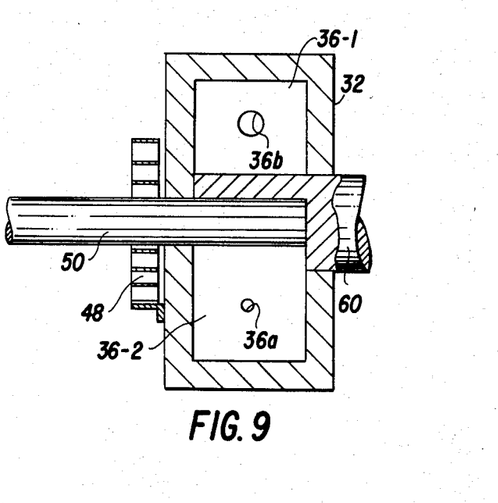
FIG. 9 is an axial sectional view as viewed on the line IX—IX of FIG. 8.

As shown in FIG. 9, the movable radial member 36-1 is connected to the driving rod 60 and the cylinder portion of the movable member 36-2 is connected to the driving rod 50 which is, in turn, connected to the spiral spring 48 as described above in conjunction with FIGS. 4 and 5.

In other respects the arrangement of FIG. 7 is identical to that shown in FIG. 3.

When the operating mechanism 16 causes the circuit breaker 12 to perform the interrupting operation, the movable member 36-1 is rotated in a clockwise direction as viewed in FIG. 8 to increase a fluid pressure within the compartment 40 which causes the movable member 36-2 to rotate in the same direction as the movable member 36-1. Thereafter the process as described above is repeated.

The arrangement of FIG. 7 has the advantages as described above in conjunction with FIGS. 3, 4 and 5.

Figure 10:
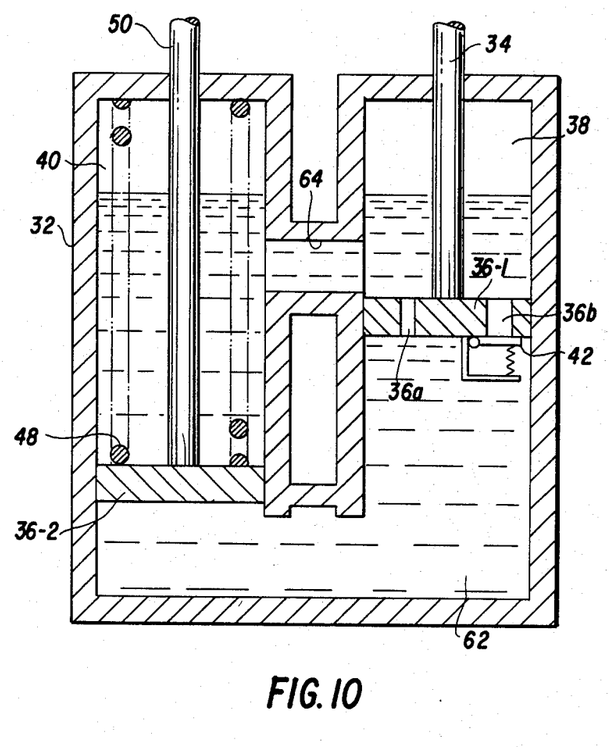
FIG. 10 is an axial sectional view of a modification of the stationary cylinder shown in FIG. 6.

FIG. 10 illustrates a modification of cylinder 32 shown in FIG. 6. The arrangement illustrated is of a structure prepared by folding the cylinder 32 as shown in FIG. 6 on the middle portion thereof to be put in the form of a U including both legs having lower ends as viewed in FIG. 10 connected in fluid communication with each other and upper portions as viewed in FIG. 10 connected to each other through a short communicating tube 64. Then the movable disc 36-1 includes the first flow passageway 36a and the second flow passageway 36b with the check valve 42 as described above in conjunction with FIG. 1. Also the driving rods 34 and 50 are connected to the movable discs 36-1 and 36-2, respectively, and are movably extended through the upper ends as viewed in FIG. 10 of the two legs of the U. In addition the fluid is charged in the cylinder 32 to leave a space on the upper portion of each leg of the U.

In other respects the cylinder 32 of FIG. 10 is identical to that shown in FIG. 6.

In the arrangement of FIG. 10 the fluid within the third compartment 62 is prevented from leaking therefrom so long as an enclosure for the cylinder 32 is a fluid tight structure. Thus it is not necessarily required to put the movable discs 36-1 and 36-2 and driving rods 34 and 50 in completely fluid tight relationship with respect to associated portions of the enclosure for the cylinder 32. Therefore the cylinder 32 can readily be produced and the movable discs 36-1 and 36-2 with the driving rods 34 and 50 can slide along the inner wall surface of the enclosure for the cylinder 32 with small frictional forces resulting in the operation of the invention.

From the foregoing it is seen that the present invention provides a locking device disposed between a circuit breaker 12 and a grounding device 24 being high in reliability with a simple structure.

While the present invention has been illustrated and described in conjunction with a few preferred embodiments thereof, it is to be understood that numerous changes and modifications may be resorted to without departing from the spirit and scope of the present invention.

What is claimed is:
1. A switching system comprising:
   an electric path,
   a circuit breaker connected to said electric path,
   a first operating mechanism for opening and closing said circuit breaker,
   a grounding device for said electric path,
   a second operating mechanism for closing and opening said grounding device,
   a means for locking said grounding device in an open state, and
   a locking control means for interlocking itself with said first operating mechanism and, responsive to an interruption by said circuit breaker, to be driven to release said locking means from its locking state, after which said locking control means causes said locking means to be returned to its locking state.

2. A switching system as claimed in claim 1 wherein said locking control means includes a fluid cylinder-piston and a linkage means for connecting said fluid cylinder-piston to each of said circuit breaker and said locking means.

3. A switching system as claimed in claim 1 wherein said locking control means comprises:
   an axially movable cylinder filled with a fluid and connected at one end to said circuit breaker,
   a piston slidably movable within said cylinder to divide said cylinder into a first compartment and a second compartment located at the one and other ends of said cylinder, said piston being connected to said locking means through the other end of said cylinder,
   a first flow passageway means for connecting said first compartment to said second compartment to permit said fluid to flow in a predetermined amount from one to the other of said first and second compartments,
   a second fluid passageway means, including a check valve to permit said fluid to only flow from said first to said second compartment, and a helical spring disposed in said second compartment to tend to force said piston toward the one end of said cylinder,
   said cylinder being responsive to the opening of said circuit breaker to be moved in the direction from the other to the one end thereof.

4. A switching system as claimed in claim 1 wherein said locking control means comprises:
   a cylinder rotatable about the longitudinal axis thereof, filled with a fluid and connected at one end to said circuit breaker through a linkage, said cylinder including a space in the form of a circular segment subtended by an angle of substantially 180 degrees,
   a vane-shaped piston slidably rotatable in said space to divide said space into a first compartment and a second compartment, said piston being connected to said locking means through another end of said cylinder and a rotatable driving rod connected to the piston,
   a first flow passageway and a second flow passageway extending through said piston, said first flow passageway permitting said fluid to flow in a predetermined amount from one to the other of said first and second compartments, said second flow passageway including a check valve to only permit said fluid to flow from said first to said second compartment, and
   a spiral spring disposed outside of said cylinder to tend to force said rotatable driving rod in a predetermined direction,
   said rotatable cylinder being responsive to the opening of said circuit breaker to be rotated in said predetermined direction.

5. A switching system as claimed in claim 1 wherein said locking control means comprises:
   a stationary cylinder filled with a fluid,
   a pair of first and second movable discs slidably movable in said cylinder to divide said cylinder into a first compartment and a second compartment located on the sides of one and the other end of said cylinder and a third compartment between said pair of first and second movable discs, said first movable disc being connected to said circuit breaker, said second movable disc being connected to said locking means, a communicating tube disposed outside of said cylinder to permit said fluid to flow from one to the other of said first and second compartments, a throttle device and a check valve for bridging said first and third compartments, said throttle device permitting said fluid to flow in a predetermined amount from one to the other of said first and third compartments, said check valve permitting said fluid to only flow from said first to said third compartment, and a helical spring disposed in said second compartment to tend to force said second movable disc toward said first movable disc, said first movable disc being responsive to the opening of said circuit breaker to be forced toward said second movable disc to pressurize said fluid within said third compartment to move said second movable disc against the action of said helical spring, thereby releasing said locking means.

6. A switching system as claimed in claim 1 wherein said locking control means comprises:

a rotatable cylinder, a pair of first and second radial members disposed in said cylinder to be rotatable relative to each other about the longitudinal axis of said cylinder and slidable along an inner surface of said cylinder to divide said cylinder into a first compartment and a second compartment, said first radial member being connected to said circuit breaker through one end of said cylinder and a first linkage, said second radial member being connected to said locking means through another end of said cylinder and a second linkage, a first flow passageway and a second flow passageway extending through said first radial member, said first flow passageway permitting fluid to flow in a predetermined amount from one to the other of said first and second flow passageways, said second flow passageway including a check valve to only permit said fluid to flow from said first to said second compartment, and a spiral spring disposed outside of said cylinder to tend to force said second linkage on the side of the other end of said cylinder in a predetermined direction, said first radial member being responsive to the opening of said circuit breaker to be rotated in said predetermined direction in said cylinder to pressurize said fluid in said first compartment to rotate said second radial member against the action of said spiral spring to release said locking means.

7. A switching system as claimed in claim 1 wherein said locking control means comprises:

a stationary cylinder in the form of a U filled with a fluid, a pair of first and second discs slidably movable in both legs of the U respectively to divide said cylinder into a first compartment and a second compartment disposed on both legs of the U respectively and a third compartment disposed between said first and second discs, said first movable disc being connected to said circuit breaker, said second movable disc being connected to said locking means, a communicating tube means for connecting said first compartment to said second compartment, a first flow passageway and a second flow passageway extending through said first movable disc, said first flow passageway permitting said fluid to flow in a predetermined amount from one to the other of said first and second compartments, said second flow passageway including a check valve to permit said fluid to only flow from said first to said second compartment, and a helical spring disposed in said second compartment to tend to force said second movable disc toward said first movable disc, said first movable disc being responsive to the opening of said circuit breaker to be forced toward said second movable disc to pressurize said fluid within said third compartment to move said second movable disc against the action of said helical spring, thereby releasing said locking means.

* * * * *